United States Patent
Bourbon et al.

(10) Patent No.: US 10,569,277 B2
(45) Date of Patent: Feb. 25, 2020

(54) METHOD OF GRINDING A MINERAL MATERIAL CONTAINING AT LEAST CALCIUM AND METAL IMPURITIES, AND PLANT SUITABLE FOR GRINDING A MINERAL MATERIAL CONTAINING CALCIUM AND METAL IMPURITIES AS THEY STAND

(75) Inventors: Didier Bourbon, Villeneuve d'Ascq (FR); Sebastien Devroe, Villeneuve d'Ascq (FR)

(73) Assignee: FIVES FCB, Villeneuve d'Ascq (FR)

( * ) Notice: Subject to any disclaimer, the term of this patent is extended or adjusted under 35 U.S.C. 154(b) by 986 days.

(21) Appl. No.: 13/696,118

(22) PCT Filed: May 5, 2011

(86) PCT No.: PCT/FR2011/000278
§ 371 (c)(1),
(2), (4) Date: Dec. 4, 2012

(87) PCT Pub. No.: WO2011/151534
PCT Pub. Date: Dec. 8, 2011

(65) Prior Publication Data
US 2013/0105606 A1    May 2, 2013

(30) Foreign Application Priority Data

May 5, 2010  (FR) ..................... 10 01926

(51) Int. Cl.
*B02C 23/14* (2006.01)
*B02C 23/12* (2006.01)

(52) U.S. Cl.
CPC .............. *B02C 23/14* (2013.01); *B02C 23/12* (2013.01); *Y02P 40/20* (2015.11)

(58) Field of Classification Search
CPC ................................ B02C 23/14; B02C 23/12
(Continued)

(56) References Cited

U.S. PATENT DOCUMENTS 3,885,744 A * 5/1975 Drage ................... B02C 23/14
                                                                241/23
3,905,556 A    9/1975 Drage
(Continued)

FOREIGN PATENT DOCUMENTS

EP    0486371    7/1991
FR    2496495    6/1982
(Continued)

OTHER PUBLICATIONS

International Search Report dated Sep. 14, 2011, in corresponding PCT application.
(Continued)

*Primary Examiner* — Anthony D Stashick
*Assistant Examiner* — Onekki P Jolly
(74) *Attorney, Agent, or Firm* — Young & Thompson (57) ABSTRACT

A method of grinding a mineral material (10) containing at least calcium impurities implemented in a plant (1) including a grinder (2) and a granulometric selection device, referred to as a selector device (3), able to separate the materials into two fractions. The method includes the following steps:

grinding the mineral material by material bed compression with the grinder to obtain a ground material, separating the ground material into a fine fraction and a coarse fraction with the selector device, returning the coarse fraction (13) to the grinder (2) for a further grinding step. At least part of the ground material is subjected to sorting intended to separate the metal impurities from the mineral materials. A plant as it stands, and the method and installation will find a particular use for producing hydraulic binders such as cement.

10 Claims, 4 Drawing Sheets

(58) Field of Classification Search
USPC ............ 241/24.1, 24.13, 24.25, 79.1, 80, 97
See application file for complete search history.

(56) References Cited

U.S. PATENT DOCUMENTS

| | | | | |
|---|---|---|---|---|
| 4,408,723 | A * | 10/1983 | Adrian | ...................... B03B 4/02 |
| | | | | 241/19 |
| 4,623,515 | A | 11/1986 | Frei et al. | |
| 5,076,506 | A * | 12/1991 | Inoue | .................... B02C 17/161 |
| | | | | 241/171 |
| 5,120,431 | A | 6/1992 | Cordonnier | |
| 5,143,304 | A * | 9/1992 | Schwyter | .................. B03B 9/04 |
| | | | | 110/346 |
| 5,205,494 | A | 4/1993 | Durinck et al. | |
| 5,333,798 | A * | 8/1994 | Paliard | ................ B02C 13/1807 |
| | | | | 241/24.1 |
| 5,354,002 | A * | 10/1994 | Folsberg | ................. B07B 7/083 |
| | | | | 209/139.2 |
| 5,375,776 | A * | 12/1994 | Kupper | ................... B02C 23/14 |
| | | | | 241/19 |
| 5,971,302 | A * | 10/1999 | Doumet | .................. B02C 15/00 |
| | | | | 241/119 |
| 6,019,299 | A * | 2/2000 | Mitsuda | .................. B02C 23/12 |
| | | | | 241/24.1 |
| 2009/0166452 | A1* | 7/2009 | Hundebol | ............. F27B 7/2033 |
| | | | | 241/17 |

FOREIGN PATENT DOCUMENTS

| | | |
|---|---|---|
| FR | 2642994 | 2/1989 |
| FR | 2658096 | 2/1990 |
| JP | 1167266 A | 6/1989 |
| WO | 97/14760 | 4/1997 |
| WO | 20081068432 | 6/2008 |

OTHER PUBLICATIONS

Translation of Japanese Office Action, dated Oct. 7, 2014, from corresponding JP application.

* cited by examiner

METHOD OF GRINDING A MINERAL MATERIAL CONTAINING AT LEAST CALCIUM AND METAL IMPURITIES, AND PLANT SUITABLE FOR GRINDING A MINERAL MATERIAL CONTAINING CALCIUM AND METAL IMPURITIES AS THEY STAND

FIELD OF THE INVENTION

The invention concerns a method of obtaining a fine fraction intended for producing hydraulic binder from a mineral material containing at least calcium and metal impurities, as well as plant suitable for grinding a mineral material containing calcium and metal materials as they stand.

The invention finds a particular application for producing hydraulic binders such as cement, in particular from slag from the metallurgical industry.

BACKGROUND OF THE INVENTION

In the manufacture of hydraulic cement, the normal way that uses lime has the drawback of emitting large quantities of $CO_2$ into the atmosphere and consuming large quantities of energy in the form of fuel.

Other materials with a high calcium content may be used for producing hydraulic binders. Among them, slag from the metallurgical industry is a source of raw material that can be reprocessed by manufacturing hydraulic cement, thus avoiding the aforementioned drawbacks. The use of this slag for manufacturing cement also makes it possible to dispose of this waste from the metallurgical industries.

However, during production thereof, the slag give rise to metal particles of various sizes, the presence of which in the cement may degrade the performance thereof, in particular if coarse particles remain in the product. When the grinder used for producing cement is a ball mill, the metal particles are fragmented during the grinding process by the impacts between the balls.

Because of their small granulometry in the end product their presence does not impair the quality of the cement. However, ball mills have a low energy efficiency compared with other grinders operating by compressing a bed of material, and consumes approximately twice the quantity of energy required by the latter.

One example of a grinder operating by material bed compression is disclosed in the document EP 0486371. The grinder in this document comprises a circular track formed by an internal wall of a cylinder, roughly horizontal, driven in a rotation movement, and a roller able to roll on the track.

When the cylinder is set in rotation, the material is ground, compressed between the roller and the internal wall of the cylinder.

However, compression grinding does not completely fragment the metal particles because of their high ductility. Coarse metal particles therefore remain present in the material leaving the grinder, or accumulate in the grinder itself.

A magnetic separation step is generally present at the input of the grinder. The role of this step is to prevent the entry of large magnetic elements that may damage the wheels (rollers) of the grinders by compression of material.

However, this magnetic separation step is not capable of eliminating the metal fractions that are included in pieces of slag.

There is also known from the document WO 97/14760 an abrasive product consisting mainly of iron oxide, with a granulometry of between 100 µm and 600 µm, its use, its production method and a method of producing secondary metal granular products from slag. The purpose of this method is to obtain secondary metal granular products that find a particular application for example as an abrasive additive or for producing ballast.

This method aims to select the majority metal part of a slag and comprises successively the following steps:
  feeding the slag into a grinder,
  grinding the slag in the grinder, obtaining a ground material,
  sorting the ground material under blown air in order to separate a mainly metal fraction from a first fine fraction,
  magnetically sorting said mainly metal fraction in order to separate the non-magnetic products from a refined product,
  sorting the refined product under blown air in order to separate metal granules from a second fine fraction, the granules comprising a plurality of distinct sizes.

Such a method makes it possible to select the majority metal part of a material but would not be suitable for satisfactorily extracting metal impurities contained residually in a mineral material.

SUMMARY OF THE INVENTION

The aim of the present invention is to overcome the aforementioned drawbacks by proposing a method of obtaining a fine fraction intended for producing hydraulic binder from a mineral material containing at least calcium and metal impurities, making it possible to obtain an end product of improved quality, suitable for producing a hydraulic binder.

Another aim of the invention is to propose an installation as it stands suitable for implementing the method.

Other aims and advantages of the present invention will emerge during the description, which is given only by way of indication and does not aim to limit it.

The invention concerns first of all a method of obtaining a fine fraction intended for producing hydraulic binder from a mineral material containing at least calcium and metal impurities. The method is implemented in an installation comprising a grinder and a granulometric selection device, referred to as a selected device, able to separate the materials into two fractions.

Said method comprises the following steps:
  said mineral material, which comprises slag from the metallurgical industry, in whole or in part, is provided,
  said mineral material is ground by material bed compression by means of the grinder, obtaining a ground material,
  the ground material is separated into said fine fraction and a coarse fraction by means of said selector device,
  the coarse fraction is returned to the grinder for a further grinding step.

According to the invention, the metal impurities are extracted by subjecting at least part of the ground material to magnetic sorting intended to separate the metal impurities from the mineral materials, the sorting being implemented either on the coarse fraction downstream of the selector device and upstream of the grinder, or between the grinder and the selector device, before separation of the ground material. According to optional features alone or in combination:
  the sorting takes place on the coarse fraction, downstream of the selector device and upstream of the grinder, the sorted mineral materials being returned to the grinder, the sorted metal materials being discharged;

the coarse fraction represents, by weight, at least 80% of the ground material issuing from the grinder;

part of the fresh mineral material directly supplies said selector device;

said fine fraction constitutes the end product;

the selector device consists of at least a dynamic separator equipped with a rotor;

the selector device comprises, apart from the dynamic separator, a static separator consisting essentially of an ascending duct, the fine materials at the discharge from said static separator feeding the entry to the dynamic separator;

the static separator effects a granulometric separation greater than 1 millimetre and said dynamic separator effects a granulometric separation at a size of less than 100 micrometres;

the mineral material is a mixture of slag from the metallurgical industry and a mineral substance, said mineral substance being able to represent at a maximum 20% by weight of the slag from the metallurgical industry.

The invention also concerns a plant suitable for grinding a metal material containing at least calcium and metal impurities, comprising:

a grinder and a granulometric separation device, referred to as a selector device, able to separate the materials into two fractions, one fine, the other coarse, said selector device comprising a dynamic separator equipped with a rotor, in particular with a vertical axis, provided with blades on its periphery, able to separate the particles according to their granulometry by subjecting said particles to opposing forces, firstly the force generated by the rotation of the rotor, which tends to reject them, and secondly the drag force generated by the speed of a gas aspirated towards the centre of the rotor, first conveying means for transporting the ground material at the discharge from the grinder to the entry of the selector device, second conveying means for transporting the coarse fraction at the discharge from said selector device to the entry of the grinder.

According to the invention, said installation also has a magnetic device cooperating with said first conveying means and/or said second conveying means, able to extract from the transported materials at least some of the metal impurities.

According to optional features of the plant:

the grinder is a horizontal roller mill;

said selector device comprises, apart from the dynamic separator, a static separator consisting essentially of an ascending duct, the fine materials at the discharge from said static separator supplying the entry to the dynamic separator;

said magnetic device cooperates with said first conveying means;

said magnetic device cooperates with said second conveying means.

The invention also concerns the use of the fine fraction obtained by implementing the method according to the invention as an end product for producing hydraulic binder such as cement or the plant according to the invention for producing hydraulic binder such as cement.

BRIEF DESCRIPTION OF THE DRAWINGS

The invention will be understood better from a reading of the following description accompanied by the appended drawings, among which.

DETAILED DESCRIPTION OF THE INVENTION

The invention concerns a method of grinding a mineral material containing at least calcium and metal impurities.

Said mineral material 10 can thus comprise slag from the metal industries in whole or in part. For example, the mineral material is a mixture of slag from the metallurgical industry and a mineral substance containing in particular calcium. According to one example, the mineral substance represents a maximum of 20% by weight of slag from the metallurgical industry.

This grinding method is implemented in a plant 1 that comprises a grinder 2 and a granulometric selection device, referred to as the selector device 3, able to separate the materials into two fractions.

The grinder 2 may be a horizontal grinder with wheel(s) (or roller). It may be a grinder of the type disclosed by the document EP 0486371, comprising a rotary cylinder with a horizontal axis and at least one roller placed inside said roller so as to roll on the track formed by the internal face of the cylinder, as well as means for driving this cylinder in rotation.

In this type of grinder, the material is ground, compressed between said roller and the internal wall of the cylinder when the latter is driven in a rotation movement on its axis.

The granulometric selection device may comprise a dynamic separator 4 equipped with a rotor. It may in particular be the dynamic separator of the type disclosed by the document FR 2642994 or by the document FR 2658096.

In this type of dynamic separator, the separation is performed by means of a cylindrical or frustoconical rotor with a vertical axis provided with blades regularly distributed over its periphery. Between said blades, the particles are subject to opposing forces, namely firstly the centrifugal force generated by the rotor rotation and which tends to reject them, and secondly the drag force generated by the speed of a gas aspirated towards the centre of the rotor, and which tends to entrain them with it towards the exit for said gas.

In this type of dynamic separator, the centrifugal force is higher for the particles with the coarsest dimension and the drag force highest for the particles with the smallest size, which performs the granulometric selection of the materials treated. The materials with dimensions less than a given selection granulometry are therefore entrained with the gas towards the gas exit while the materials with dimensions greater than said given granulometry fall and are collected.

The selector device may comprise, apart from the dynamic separator 4, a static separator 5 consisting essentially of an ascending duct. In this selector device 3, with two separation stages, the fine materials at the discharge from the static separator 5 feed the entry to the dynamic separator 4.

This static separator 5 may be of the type disclosed in the application WO 2008/068432. This static separator consists essentially of a vertical duct with ascending flow provided with a gas inlet at its base and equipped with a lower opening and an upper opening as well as a feed opening for the materials to be treated between said lower opening and said upper opening. In this static separator, the fine materials escape with the gas through the upper opening by virtue of the lift of said ascending flow while another part of the coarser materials is not entrained by said gas and falls through the lower opening.

This static separator may also have means for creating turbulence placed between the lower opening and the opening feeding the conduit, in particular in the form of roughly horizontal blades fixed against the internal wall of the gas conduit and oriented towards the centre of the conduit, as developed in the application WO 2008/068432.

The method according to the invention comprises the following steps:
- said mineral material 10 is ground, by material bed compression, by means of the grinder 2, obtaining a ground material 11,
- the ground material 11 is separated into a fine fraction 12, constituting in particular the end product, and a coarse fraction 13 by means of said selector device 3,
- the coarse fraction 13 is returned to the grinder 2 for a further grinding step.

According to the invention, at least some of the ground material 11 or 13 is subjected to sorting intended to separate the metal impurities from the mineral materials.

This sorting step may be a magnetic sorting, implemented in particular by various items of equipment such as magnetic detectors and magnetic extractors in particular installed above conveyors, in particular belts that convey the material to be processed.

The magnetic detectors detect the metal fragments by creating an electromagnetic field for diverting the material containing said metal fragments. The extractors comprise magnets and attract magnetic particles in order to eliminate them. However, the latter item of equipment cannot extract the magnetic particles situated under the bed of material.

Advantageously, the coarse fraction 13 may represent by weight at least 80% of the ground material issuing from the grinder 2. In this way an extensive cycle is created so that the material can be subjected several times, successively, to sorting, in particular magnetic, which improves the performance of the sorting.

A satisfactory elimination of the magnet fractions is obtained by at least four successive passages of the material through the magnetic sorting step, which corresponds to the proportion of remaining material of at least 80% of the ground material.

Figure 1:
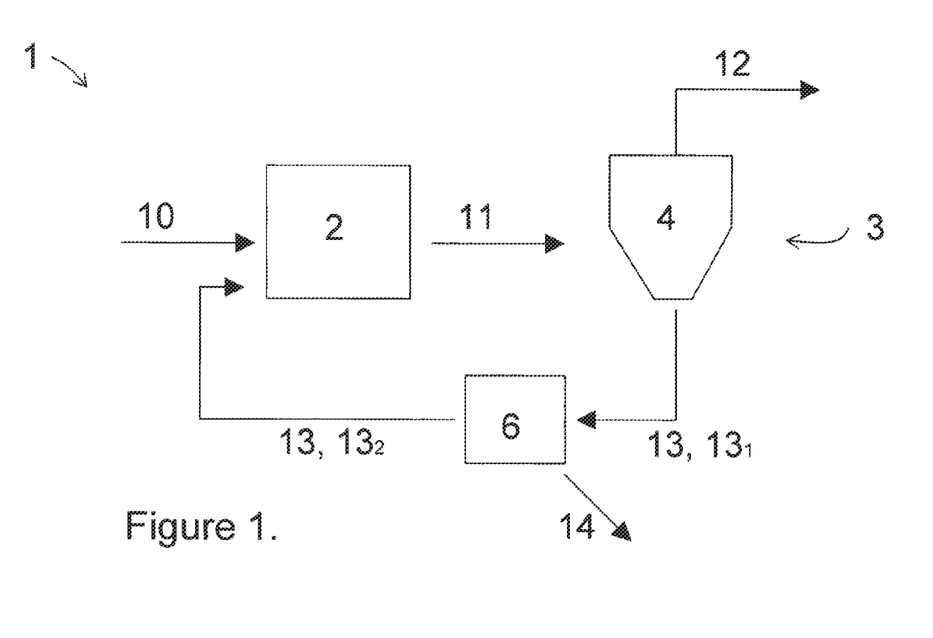
FIG. 1 is a schematic illustration of a grinding method according to the invention according to a first embodiment.
Figure 2:
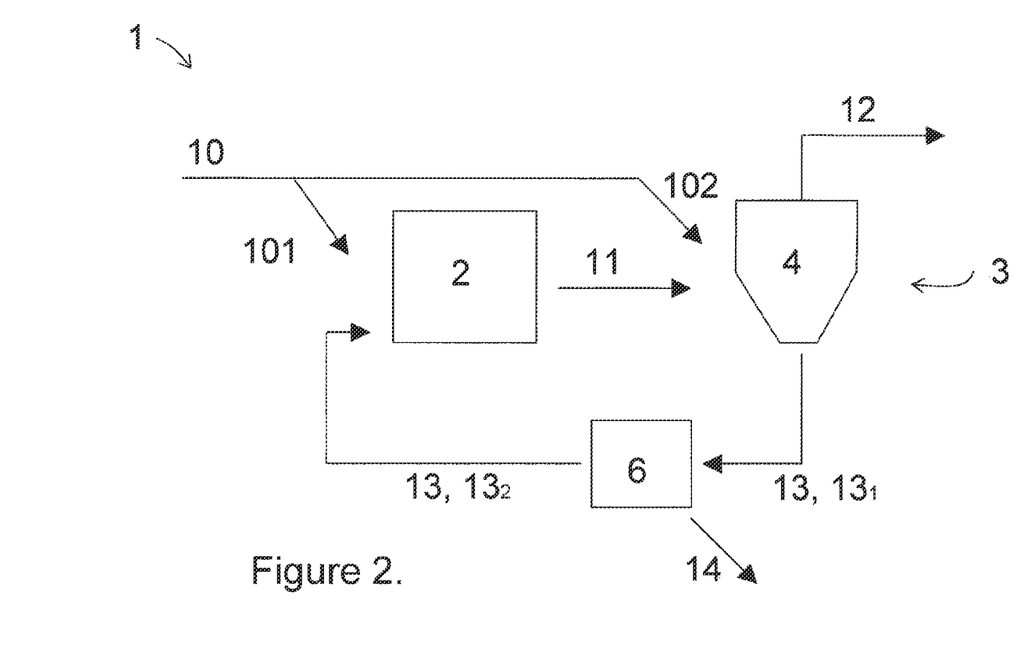
FIG. 2 is an example of a grinding method according to the invention according to a second embodiment.
Figure 3:
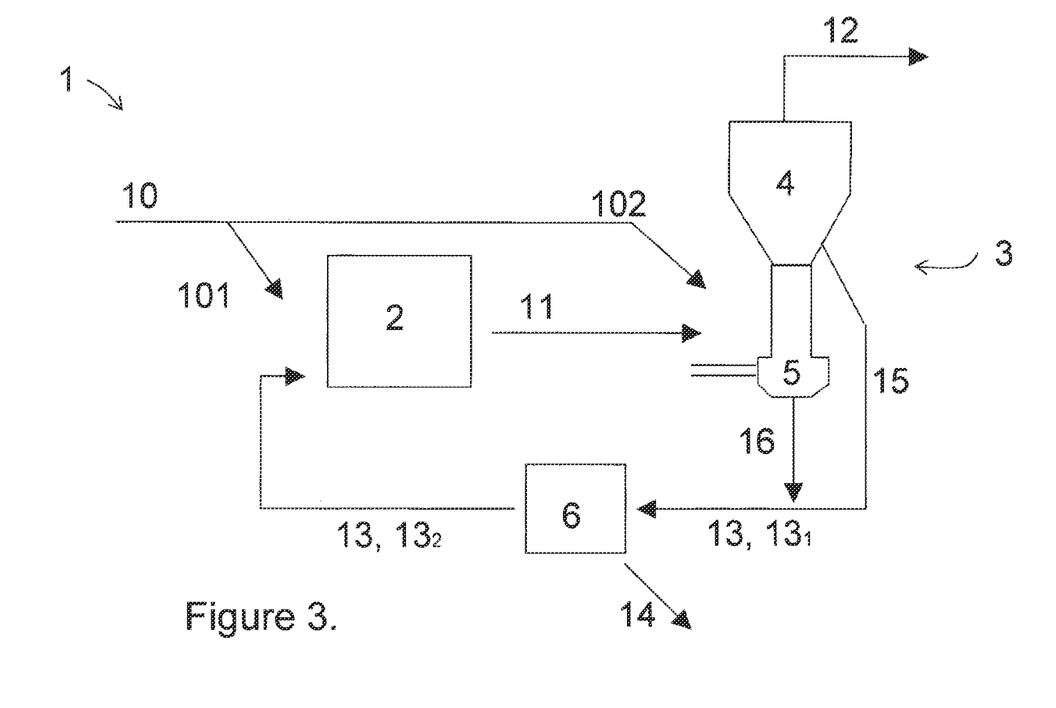
FIG. 3 is an example of a grinding method according to the invention according to a third embodiment.

According to the embodiments illustrated by FIGS. 1 to 3, which are non-limitative, the sorting can take place on the coarse fraction $13_1$, downstream of the selector device 3, and upstream of the grinder 2. The sorted mineral materials $13_2$ are returned to the grinder 2, the sorted metal materials 14 being discharged.

Figure 4:
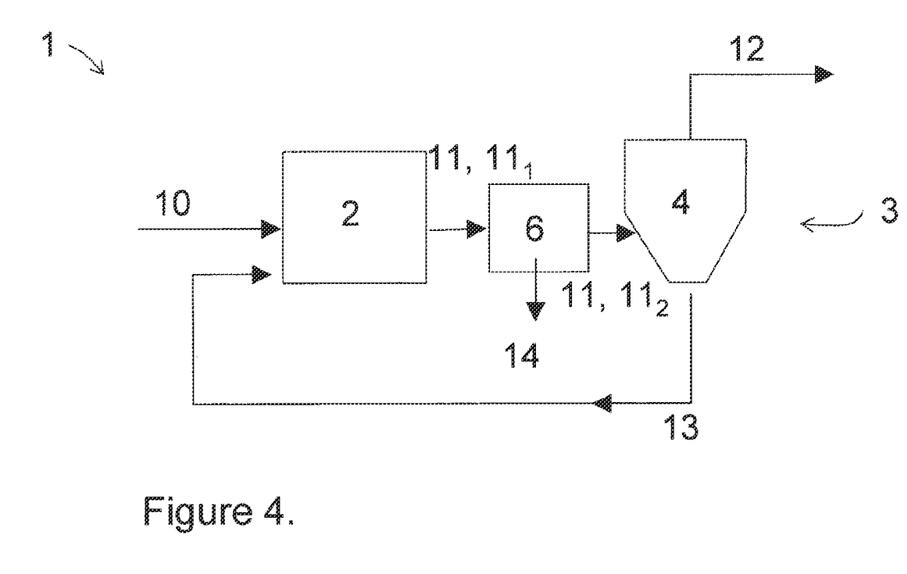
FIG. 4 is an example of a grinding method according to the invention according to a fourth embodiment.

According to another embodiment illustrated in FIG. 4, the sorting step can be implemented between the grinder 2 and the selector device 3, before separation of the ground material 11.

According to a non-limitative example shown in FIG. 3, a part 102 of the mineral material 10 directly supplies the selector device 3.

We now describe in detail the non-limitative examples of FIGS. 1 to 3.

FIG. 1 shows a grinding method using a grinder 2 of the material bed compression grinder type, and a granulometric selection device 3 consisting of a dynamic separator 4 equipped with a rotor. The material to be treated 10 is fed to the grinder 2, which performs a grinding step, producing a ground material 11. This ground material 11 is conducted, by means of first conveying means, to the selector device 3, which separates the ground material 11 into a fine fraction 12, the end product, and a coarse fraction 13.

The coarse fraction 13 is transported once again to the entry to the grinder 2 by second conveying means.

A magnetic device 6 cooperates with the second conveying means and extracts from the transported materials some of the metal impurities. More particularly, the sorted metal materials 14 are discharged, the sorted mineral materials $13_2$ being routed by said second conveying means to the entry to the grinder 2.

FIG. 2 shows a second embodiment of the invention. It is distinguished from the embodiment in FIG. 1 in that a part 102 of the mineral material 10 directly feeds the selector device 3.

The grinder 2 produces the ground material 11 from a fraction 101 of the mineral material that is supplied directly, and from the recycled material $13_2$. The selector device 3 processes all the materials 11 and 102 and separates a fine fraction 12, the end product, and a coarse fraction 13. The coarse fraction is subjected to magnetic sorting by means of the magnetic device 6. The sorted metal materials 14 are discharged while the sorted mineral material $13_2$ is routed to the grinder 2 with a view to a further grinding step.

FIG. 3 represents a third embodiment of the invention wherein the granulometric selection step comprises two successive stages 5, 4.

The first stage is a static separator 5 and performs a granulometric separation at a large size greater than 1 millimetre, while the second stage is a dynamic separator 4 equipped with a rotor, which performs a granulometric separation at its smaller size less than 100 micrometres.

A part 102 of the raw material 10, with a high fine particle content, is directly conducted to the granulometric selection step, and more particularly to the feed entry of the static separator 5. The grinder produces the ground material 11 from a part 101 of the mineral material 10 that is directly supplied to the grinder 2, and a part of the coarse fraction $13_2$ that is recycled. The static separator 5 and the dynamic separator 4 process together the materials 11, 102 and separate a fine fraction 12 from a coarse fraction 13.

More particularly, the coarse fraction 13 is composed of a coarse fraction 16 rejected by the static separator 5 and a coarse fraction 15 rejected by the dynamic separator 4.

This coarse fraction 13 is conducted by conveying means to the entry to the grinder 2. A magnetic device 6 cooperates with the conveying means and extracts from the transported materials some of the metal impurities. More particularly, the magnetic device 6 discharges the sorted metal material 14, the sorted mineral material $13_2$ being routed to the grinder 2 with a view to a further grinding step.

The embodiment in FIG. 4 is distinguished from that in FIG. 1 through the position of the magnetic device 6 that cooperates with said first means of conveying between the grinder 2 and the selector device 3. The ground material 11, $11_1$ at the discharge from the grinder is subjected to the action of the magnetic device 6, which discharges the sorted metal material 14 while the other part of the ground material 11, $11_2$ is routed to the selector device 3.

In the embodiment in FIGS. 1 to 4, the grinder may be a horizontal roller grinder.

First conveying means, such as belt conveyors or the like, transport the ground material 11 at the discharge from the grinder 2 to the entry to the selector device 3.

Second conveying means, such as belt conveyors or the like, transport the coarse fraction 13 at the discharge from the selector device 3 to the entry to the grinder 2.

Naturally other embodiments could have been envisaged by persons skilled in the art without for all that departing from the scope of the invention defined by the following claims.

The invention claimed is:

1. A method for obtaining a fine fraction from a mineral material containing at least calcium and metal impurities, said method comprising the following steps:
   providing said mineral material being slag from the metallurgical industry containing at least calcium and metal impurities or a mixture of slag from the metallurgical industry and a mineral substance,
   obtaining a ground material by grinding said mineral material by material bed compression with a single grinder,
   separating the ground material into a fine fraction and a coarse fraction by means of a granulometric selection device,
   extracting metal impurities from the coarse fraction by subjecting the coarse fraction to magnetic sorting,
   returning the coarse fraction from which metal impurities have been extracted to the single grinder for a further grinding step and a further separating step to obtain a fine fraction, and
   collecting fine fractions,
   wherein the extracting by magnetic sorting is implemented on the coarse fraction after separating the coarse fraction from the fine fraction using a granulometric selection device and before grinding using the grinder, the mineral materials from which metal impurities have been extracted being returned to the grinder, the extracted metal impurities being discharged, and
   wherein at least four successive passages through the magnetic sorting enable satisfactory elimination of the metal impurities because the coarse fraction represents by weight at least 80% of the ground material issuing from the single grinder, and
   wherein the method is implemented in plant comprising said single grinder and said granulometric selection device.

2. The method according to claim 1, wherein a part of the mineral material directly supplies said granulometric selection device.

3. The method according to claim 1, wherein the granulometric selection device comprises at least a dynamic separator equipped with a rotor.

4. The method according to claim 3, wherein said granulometric selection device comprises, apart from the dynamic separator, a static separator consisting essentially of an ascending duct, the fine materials discharged from said static separator feeding the entry to said dynamic separator.

5. The method according to claim 4, wherein the static separator effects a granulometric separation greater than 1 millimetre and said dynamic separator effects a granulometric separation at a size less than 100 micrometres.

6. The method according to claim 1, wherein the mineral material is a mixture of slag from the metallurgical industry and a mineral substance.

7. The method according to claim 1, wherein a part of the mineral material directly supplies said granulometric selection device.

8. The method according to claim 1, wherein the selector device comprises at least of a dynamic separator equipped with a rotor.

9. A method for obtaining a fine fraction comprising at least calcium from a mineral material containing at least calcium and metal impurities, said method comprising the following steps:
   providing a mineral material containing at least calcium and metal impurities, said mineral material being slag from the metallurgical industry or a mixture of slag from the metallurgical industry and a mineral substance;
   subjecting said mineral material to at least four successive passages through a magnetic sorting device to enable satisfactory elimination of the metal impurities and obtained a purified mineral material,
   wherein prior to each passage through said magnetic sorting device, pre-purified mineral material is subjected to the steps of:
   (i) grinding said pre-purified mineral material by material bed compression using a single grinder, and
   (ii) separating a fine fraction from pre-purified mineral material obtained from said single grinder using a granulometric selection device;
   after subjecting said mineral material to said at least four successive passages to obtain said purified mineral material, grinding said purified mineral material by material bed compression using said single grinder, and separating a fine fraction from said purified mineral material obtained from said single grinder using said granulometric selection device, and
   collecting each fine fraction obtained from said granulometric selection device, each fine fraction comprising at least calcium.

10. A method for obtaining a mineral substance comprising calcium as a fine fraction from a mineral material comprising slag from the metallurgical industry, said method comprising the following steps:
    providing a mineral material comprising slag from the metallurgical industry, said slag from the metallurgical industry containing at most 20% by weight of a mineral substance comprising calcium and metal impurities;
    grinding said mineral material by material bed compression with a single grinder to produce a first ground material;
    separating the first ground material into a first fine fraction and a first coarse fraction using a granulometric selection device, said first coarse fraction being at least 80% of said first ground mineral material;
    collecting said first fine fraction from said granulometric selection device;
    subjecting said first coarse fraction to magnetic sorting to extract a first portion of metal impurities from the first coarse fraction and obtain a first coarse fraction with reduced metal impurities;
    grinding said first coarse fraction with reduced metal impurities with said single grinder to produce a second ground material;
    separating said second ground material into a second fine fraction and a second coarse fraction using said granulometric selection device;
    collecting said second fine fraction from said granulometric selection device;
    subjecting said second coarse fraction to magnetic sorting to extract a second portion of metal impurities from the second coarse fraction to obtain a second coarse fraction with reduced metal impurities;
    grinding said second coarse fraction with reduced metal impurities with said single grinder to produce a third ground material;

separating said third ground material into a third fine fraction and a third coarse fraction using said granulometric selection device;

collecting said third fine fraction from said granulometric selection device;

subjecting said third coarse fraction to magnetic sorting to extract a third portion of metal impurities from the third coarse fraction and obtain a third coarse fraction with reduced metal impurities; and collecting said third coarse fraction with reduced metal impurities with said single grinder to produce a fourth ground material;

separating said fourth ground material into a fourth fine fraction and a fourth coarse fraction using said granulometric selection device; and collecting said fourth fine fraction from said granulometric selection device, wherein said mineral substance comprising calcium is obtained as said collected fine fractions.

\* \* \* \* \*